(No Model.) 2 Sheets—Sheet 1.

G. C. WATSON & J. S. WILLIAMS.
MUZZLE.

No. 490,795. Patented Jan. 31, 1893.

Witnesses
Jas. K. McCathran
N. F. Riley

Inventors
George C. Watson
James S. Williams
By their Attorneys,
C. A. Snow & Co.

(No Model.) 2 Sheets—Sheet 2.
G. C. WATSON & J. S. WILLIAMS.
MUZZLE.
No. 490,795. Patented Jan. 31, 1893.
FIG. 2.
FIG. 5.
FIG. 4.
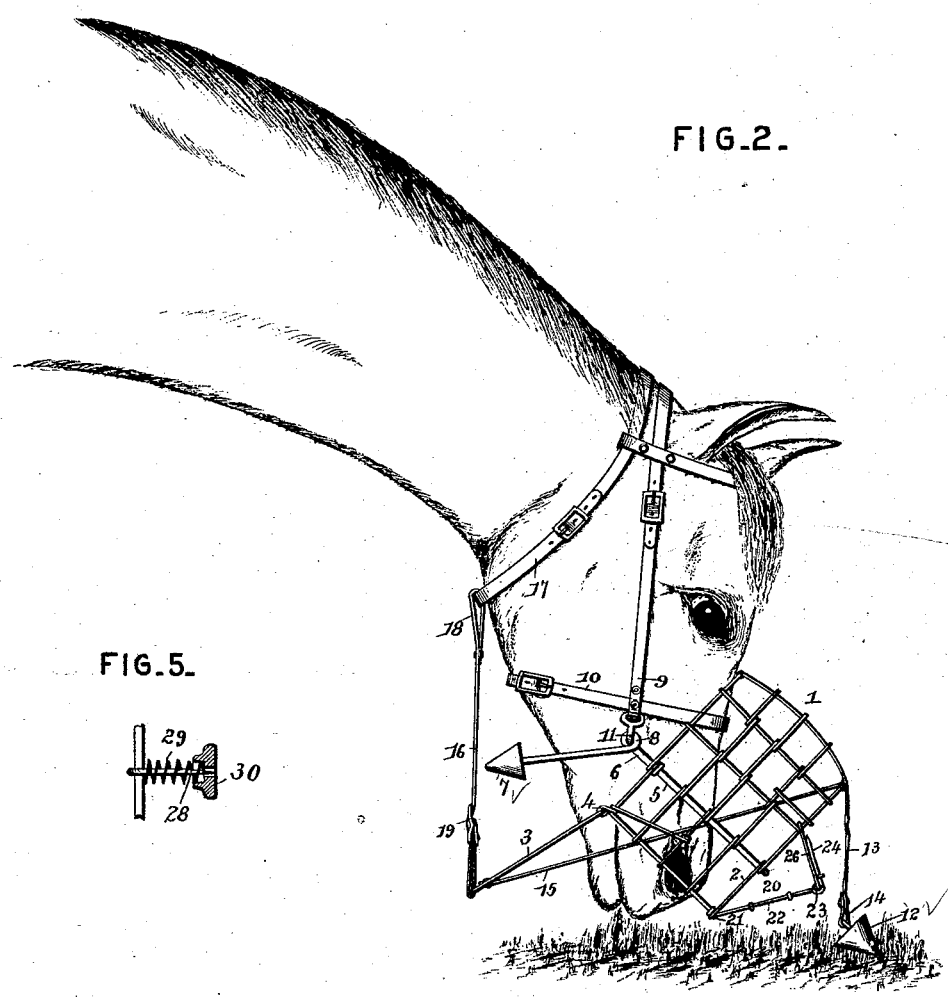
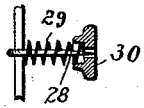
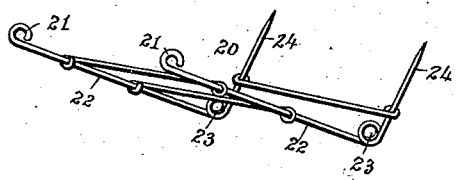
Witnesses
Jas. K. McCathran
N. J. Riley
Inventors
George C. Watson
James S. Williams
By their Attorneys,
C. A. Snow & Co.

UNITED STATES PATENT OFFICE.

GEORGE C. WATSON AND JAMES S. WILLIAMS, OF CHESTNUT, ALABAMA.

MUZZLE.

SPECIFICATION forming part of Letters Patent No. 490,795, dated January 31, 1893.

Application filed September 24, 1892. Serial No. 446,823. (No model.)

*To all whom it may concern:*

Be it known that we, GEORGE C. WATSON and JAMES S. WILLIAMS, citizens of the United States, residing at Chestnut, in the county of Monroe and State of Alabama, have invented a new and useful Muzzle, of which the following is a specification.

The invention relates to improvements in muzzles.

The object of the present invention is to provide a stock muzzle which will cover the mouth of an animal when its head is elevated, and which, when the head of the animal is lowered for grazing, will automatically rise and open to permit the animal to graze freely.

A further object of the invention is to prevent an animal striking with its nose and knocking off ears of corn, injuring fences and the like, and also to prevent the muzzle being injured when an animal is rolling.

The invention consists in the construction and novel combination and arrangement of parts hereinafter fully described, illustrated in the accompanying drawings and pointed out in the claims hereto appended.

Figure 1:
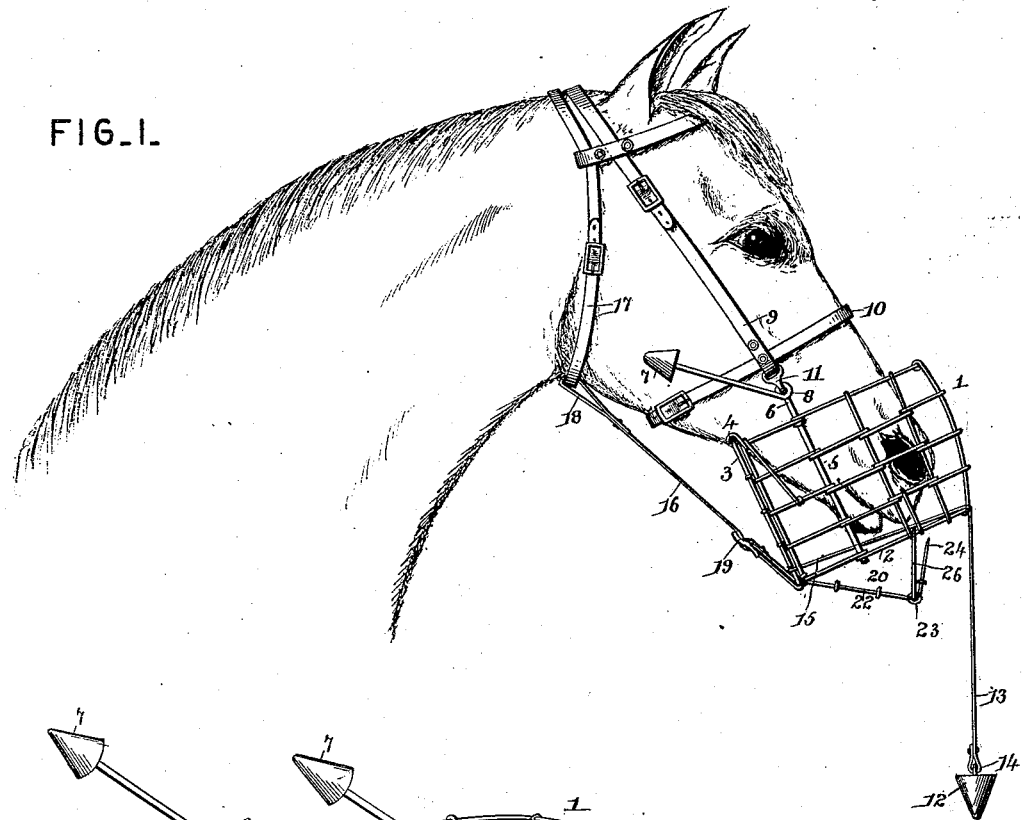
Figure 3:
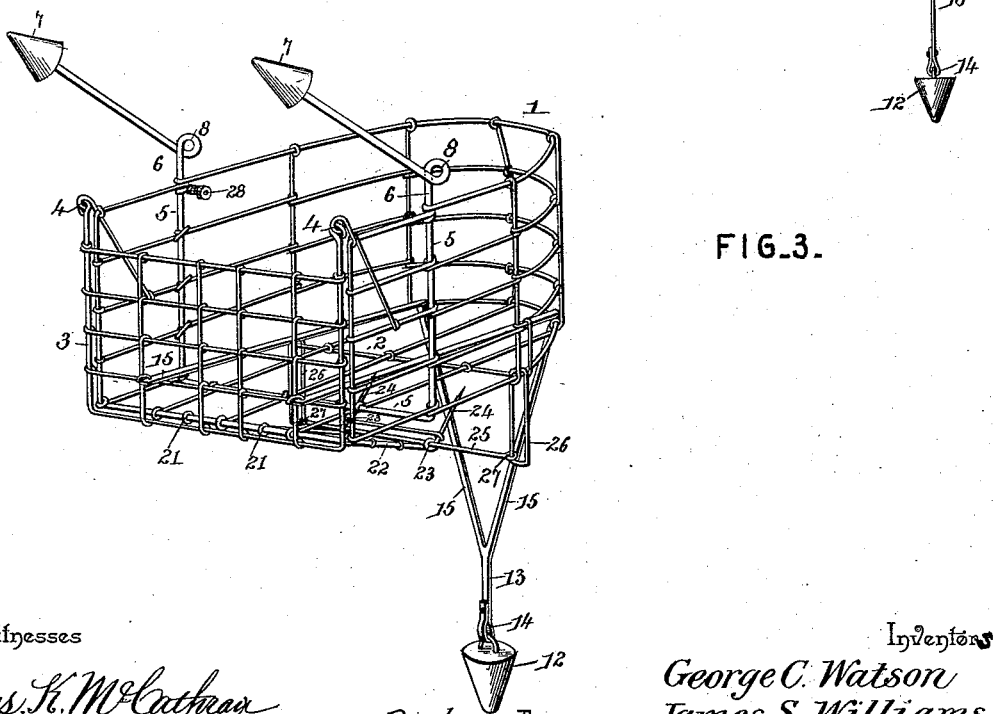

In the drawings—Figure 1 is a side view of a muzzle constructed in accordance with this invention and shown applied to an animal, the latter having its head elevated. Fig. 2 is a similar view the animal having its head lowered for grazing. Fig. 3 is a detail perspective view of the muzzle detached. Fig. 4 is a detail perspective view of the hinged frame. Fig. 5 is a detail view, showing one of the side points with its button and spring.

Like numerals of reference indicate corresponding parts in all the figures of the drawings.

1 designates a muzzle constructed of stout wire and adapted to fit over the nose and cover the mouth of an animal when the head of the same is an elevated position, and to raise and open automatically to uncover the mouth of the animal to permit the same to graze freely when the head is lowered. The muzzle consists of continuous front and sides, a bottom 2 connecting the lower edges of the same, and a back 3 hinged at its top to the upper rear ends of the sides at 4, and adapted to swing rearward to provide an opening to permit the animal to graze. A rectangular brace 5 extends transversely of the bottom and up the sides of the muzzle, and is provided with upwardly extending arms 6 having rearwardly inclined outer portions, and provided at their outer ends with weights 7. The arms are provided near their angles with eyes 8 and are hinged to the lower ends of the head stall 9 of a halter 10 by snap hooks 11. The weights at the outer ends of the arms counterbalance the weight of the muzzle, and lift the latter when the head of the animal is lowered for grazing, and when the muzzle is released from the action of a weight 12 which depends from the front of the muzzle, and which when the head of the animal is lowered is supported upon the ground. The weight 12 is heavier than the counterbalancing weights of the arms, and is adapted to pull the muzzle downward to cover the mouth of the animal when the head thereof is elevated, and it is connected with the muzzle by a strap 13. The strap 13 is provided at its outer end with a loop 14 to engage an eye of the weight 12; and it is bifurcated throughout the greater portion of its length to form opposite sides 15 which enter the muzzle at the front thereof, and which extends along the bottom from front to rear, and are connected at their rear ends to the hinged back 3 near the bottom thereof at opposite sides of the same, whereby when the muzzle is raised, the weight will not only swing the muzzle downward, but will also close the hinged back. The hinged back has the upper ends of its side wires extended and provided with eyes which are linked into eyes of the muzzle, and the bottom of the muzzle is connected by a strap 16 with a throat latch 17 of the halter. The strap 16 is provided at its upper end with a loop 18 and at its lower end with a buckle 19 which forms a loop for connecting the strap with the hinged back 3.

In order to prevent an animal butting or striking with its nose and knocking off ears of corn, or otherwise doing injury, an approximately rectangular frame 20 is provided and carries points to stick into the nose of the animal when the frame is brought in contact with an object by reason of the animal attempting to strike that object with its nose or mouth. The frame is provided at its rear end with eyes 21 formed integral with side wires 22, and hinging the frame to the rear edge of the bottom; and the front ends of the side wires are coiled to form eyes 23 and are bent upward at right angles to provide projecting points 24 designed to stick the nose of an animal when the frame comes in contact with an object. The front end of the hinged frame 20 is connected with the muzzle by means of a transverse rod 25 and side loops 26. The transverse rod is arranged in the eyes 23, and is provided at its ends with eyes 27 receiving the side links 26, which receive the bottom wire of the sides of the muzzle. The side links enable the hinged frame to move to and from the muzzle, and the normal position of the hinged frame is at an angle to the bottom of the muzzle, and the points are normally held outside of the muzzle. When the muzzle is lifted by means of the counterbalancing weights, the bottom 2 is in a vertical position, and the hinged frame inclines upward and outward, and is not liable to come in contact with anything while the animal is grazing. Each side of the muzzle is provided with an inwardly extending point 28 adapted to stick an animal should the latter in rolling strike the sides of the muzzle against the ground. This construction prevents an animal injuring the muzzle when rolling or lying upon the ground. On each point 28 is mounted a spiral spring 29 and a button 30 which is arranged at the ends of the point and is provided with a central opening to receive the point; and the spiral spring is interposed between the button and the side of the muzzle and prevents the points sticking an animal when the muzzle is not in contact with anything.

What we claim is—

1. The combination of a muzzle provided with upwardly extending arms having eyes and adapted to be hinged to a halter, counterbalancing weights arranged at the outer ends of the arms and adapted to lift the muzzle when the head of an animal is lowered, and a weight loosely connected with the muzzle and adapted to swing the muzzle downward when the head of an animal is raised and to be supported on the ground when the head of the animal is lowered to relieve the muzzle, substantially as described.

2. The combination of a muzzle, a rectangular brace extending transversely of the bottom and up the sides and provided with extended arms having inclined portions and provided with eyes, counterbalancing weights arranged at the outer ends of the arms, and a weight loosely connected with the front of the muzzle, substantially as described.

3. The combination of a muzzle provided with upwardly extending arms and having a back hinged at the top and adapted to swing rearward to open the muzzle, counterbalancing weights attached to the outer ends of the arms, a strap connected with the hinged back and passing through the front of the muzzle, and a weight secured to the strap, substantially as described.

4. The combination with a halter, of a muzzle provided with upwardly extending arms hinged near their inner ends to the halter and provided at their outer ends with counterbalancing weights, a hinged back, a strap bifurcated throughout the greater portion of its length to form opposite sides and having the same passed through the muzzle and connected to the hinged back, a weight connected to the strap and depending from the front of the muzzle, and a strap connected to the hinged back and to the throat latch of the halter, substantially as described.

5. A muzzle provided on its bottom with a frame hinged at its rear end and provided at its front end with upwardly extending points, substantially as and for the purpose described.

6. The combination of a muzzle, a frame hinged to the bottom thereof and provided with upwardly extending points, and loops arranged at opposite sides of the frame and connected therewith and loosely receiving the muzzle whereby the frame is adapted to swing inward and outward, substantially as described.

7. The combination with a muzzle, a frame hinged at one end to the muzzle and provided at its opposite end with inwardly extending points adapted to enter the muzzle, and having eyes arranged adjacent to the point, a transverse bar passing through the eyes, and side loops connected with the ends of the bar and loosely receiving wires of the muzzle at opposite sides thereof, substantially as described.

In testimony that we claim the foregoing as our own we have hereto affixed our signatures in the presence of two witnesses.

GEORGE C. WATSON.
JAMES S. WILLIAMS.

Witnesses:
W. A. DEXTER,
H. A. RATCLIFFE.